United States Patent [19]

Shaw

[11] Patent Number: 5,610,909
[45] Date of Patent: Mar. 11, 1997

[54] MULTISTAGE ECHO CANCELER INCLUDING TIME VARIATION COMPENSATION

[75] Inventor: David G. Shaw, Middletown, N.J.

[73] Assignee: Lucent Technologies Inc., Murray Hill, N.J.

[21] Appl. No.: 455,385

[22] Filed: May 31, 1995

[51] Int. Cl.$^6$ ........................................... H04B 3/20
[52] U.S. Cl. ................................. 370/291; 379/410
[58] Field of Search ........................ 370/32.1, 32, 100.1, 370/103, 108; 379/402, 403, 404, 406, 407, 408, 409, 410, 411, 420, 3, 5, 318, 345; 364/724.1, 720; 373/18, 28 R; 375/229, 230, 232, 233, 226, 227, 254, 252, 284, 285, 296, 348; 381/63, 13, 71, 93, 94, 95, 96, 99, 107, 108

[56] References Cited

U.S. PATENT DOCUMENTS

| | | | |
|---|---|---|---|
| 3,500,000 | 3/1970 | Kelly et al. | 370/32.1 |
| 5,353,279 | 10/1994 | Koyama | 370/32.1 |
| 5,396,517 | 3/1995 | Yedid et al. | 370/32.1 |
| 5,463,618 | 10/1995 | Furukawa et al. | 370/32.1 |

Primary Examiner—Douglas W. Olms
Assistant Examiner—Dang Ton
Attorney, Agent, or Firm—Thomas Stafford

[57] ABSTRACT

Acoustic echos are canceled by employing a first echo canceler having a comparatively long first impulse response synthesis capability which is connected between a transmit path and receive path for generating a first error signal and for canceling echo signals in the transmit path, and at least a second echo canceler having a comparatively short second impulse response synthesis capability connected in parallel with the first echo canceler between the transmit and the receive path. The second echo canceler is supplied with the first error signal from the first echo canceler and is adaptively operating simultaneously with but independent of the first echo canceler to further cancel echos in the transmit path. Specifically, the first echo canceler is intended to capture the substantially stationary and any slowly varying components of the echo path impulse response, and the second echo canceler is intended to capture the more time varying, i.e., dynamically varying, component of the echo path impulse response.

22 Claims, 3 Drawing Sheets

MULTISTAGE ECHO CANCELER INCLUDING TIME VARIATION COMPENSATION

CROSS-REFERENCE TO RELATED APPLICATIONS

U.S. patent applications Ser. No. 08/368,687 and Ser. No. 08/368,684 were filed on Jan. 4, 1995, and U.S. patent application Ser. No. 08/455,377 was filed concurrently herewith.

TECHNICAL FIELD

This invention relates to cancelation of echos in a communication circuit and an acoustic environment and, more particularly, to compensating for time variation in the echo path.

BACKGROUND OF INVENTION

Echo cancelers are commonly used to compensate for both electrical and acoustic echos in communications systems. Typical echo cancelers use well known adaptive filtering algorithms to construct a model of the echo chapel which is excited by the same signal that is delivered to the actual echo channel. In some instances, the echo path can be time varying, for example, when a person or some other object moves about in an acoustic environment where an acoustic echo is being canceled. In such situations a large adaptation step size is often used to improve the convergence speed of the adaptive filtering algorithm used in the echo canceler. Use of a large step size, however, has detrimental effects on the overall performance of the echo canceler and any resulting residual echo, and tends to result in a less stable echo canceler. In order to effectively cancel acoustic echos, it is also desirable to employ an echo canceler having a "long" impulse response in order to model the echo duration found in typical rooms or the like. Use of such "long" echo cancelers having a long impulse response synthesis capability usually means slow convergence times of the adaptive filtering algorithms used in the echo canceler. Thus, when movement occurs in the room, or the impulse response of the echo path changes, the adaptive filtering algorithms used in the echo canceler have difficulty "reconverging" to the new echo path impulse response.

One technique for recovering from echo path changes includes the use of recursive update algorithms, which are known to converge faster than the conventional LMS technique. An arrangement disclosed in an article by V. A. Margo et al. entitled "Multiple Short-Length Adaptive Filters For Time-Varying Echo Cancellation", 1993 *IEEE International Conference on Acoustics, Speech, and Signal Processing*, Apr. 27–30, 1993, pages I-161–I-164, deals with sparse echo path responses by employing multiple separated echo cancelers that are spaced in time along the echo path. Unfortunately, acoustic echos can not in general be viewed as having a sparse impulse response. It has also been proposed to use a larger step size on the coefficients of the adaptive filtering algorithm being used that are large and a smaller step size on smaller coefficients, along with several other variants.

SUMMARY OF THE INVENTION

I have observed that for an acoustic system, most of the change in the echo path impulse response occurs as a result of movement close to either the microphone or the loudspeaker used in the system. Thus, the largest change in the echo path impulse response occurs in a relatively short time interval compared to the length of the whole echo path impulse response. Most of the remaining portion of the echo path impulse response remains substantially stationary. Therefore, if the echo path impulse response is treated as two separate impulse responses, one substantially stationary and one dynamic, i.e., time varying, two separate echo cancelers can be used to deal individually with each portion of the impulse response.

Therefore, the problems and limitations of prior acoustic echo canceler arrangements are overcome by employing a first echo canceler having a comparatively long first impulse response synthesis capability which is connected between a transmit path and receive path for generating a first error signal and for canceling echo signals in the transmit path, and at least a second echo canceler having a comparatively short second impulse response synthesis capability connected in series with a delay unit, with the series connection connected in parallel with the first echo canceler between the transmit and the receive path. The second echo canceler is supplied with the first error signal from the first echo canceler and is adaptively operating simultaneously with but independent of the first echo canceler to further cancel echos in the transmit path.

Specifically, the first echo canceler is intended to capture the substantially stationary and any slowly varying components of the echo path impulse response, and the second echo canceler is intended to capture the more time varying, i.e., dynamically varying, component of the echo path impulse response. Because the second echo canceler has a shorter impulse response synthesis capability than the first echo canceler, it will adapt significantly faster than the first echo cancel and, therefore, it can capture the more time varying component of the echo path impulse response.

I have further recognized that in certain applications, the more time varying component of the echo path impulse response may exist in a relatively short time interval. For instance, in the canceling of acoustic echos, the most time variation in the echo path impulse response results from the movement of objects and/or persons near either the microphone or the loudspeaker. This movement results in significant changes in the early portion of the echo path impulse response. Aligning the tap coefficients of the second echo canceler with this early portion of the echo path impulse response provides significantly enhanced echo cancelation performance over that achievable with only the first echo canceler. This is realized by placing a "short" fixed delay in series with the receive path signal to the second echo canceler.

In other applications, the time varying component of the echo path impulse response still exists in a relatively short time interval, but the time varying component relative to the overall echo path impulse response may change with time or may not be known a priori. Under these circumstances, it is desirable to dynamically align the coefficients of the second echo canceler over the echo path impulse response. This is realized by employing a dynamically adjustable delay in series with the receive path to the second echo canceler. In one embodiment, the delay value is dynamically generated in response to the tap coefficient values of the first echo canceler.

In another embodiment, the delay is dynamically set to a value such that a predetermined tap coefficient, for example the center one, of the second echo canceler is substantially aligned with the first echo canceler tap coefficient having the largest value.

In still another embodiment, a determination is made as to which of the first echo canceler tap coefficients values are changing the most. Then, the delay in series with the second echo canceler is dynamically adjusted to a value such that a predetermined tap coefficient, for example the center one, of the second echo canceler is substantially aligned with the first echo canceler tap coefficient having the largest value.

In yet another embodiment, the tap coefficients of the first echo canceler are divided into groups, each having a predetermined number of tap coefficients. Then, the changing nature of the tap coefficient values in each group is used in determining the dynamic delay value adjustment in order to position the tap coefficients of the second echo canceler relative to the tap coefficients of the first echo canceler.

DETAILED DESCRIPTION

Figure 1:
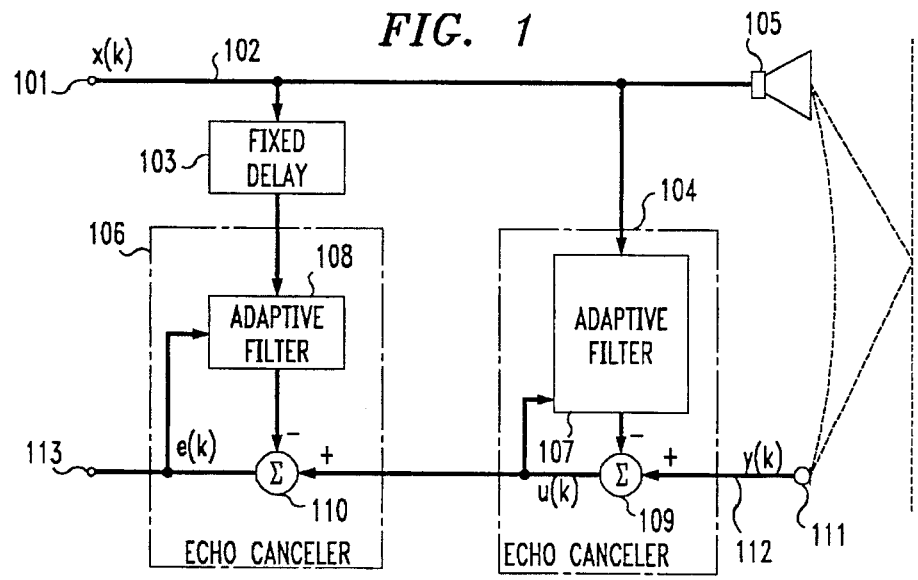
FIG. 1 shows, in simplified block diagram form, details of an audio system including first and second echo cancelers in one embodiment of the invention employing a fixed delay in series with the second echo canceler.

FIG. 1 shows, in simplified block diagram form, one embodiment of the invention including an echo canceler arrangement that can be employed in either a full-band application or as one of a multiple of sub-bands. Specifically, a received signal x(k) is supplied to receive input 101 and, in turn, via receive path 102 to fixed delay 103, echo canceler 104 and loudspeaker 105. Echo canceler 106 is connected in series with fixed delay 103. Echo cancelers 104 and 106 may be any one of a number known in the art. It is noted that the signals being processed in echo cancelers 104 and 106, and fixed delay 103 are digital. The required digital to analog (D/A) and analog to digital (A/D) converters in receive path 102 and transmit path 112, respectively, are not shown. In this example, echo cancelers 104 and 106 include adaptive transversal filters 107 and 108, respectively, which are of a type broadly disclosed in U.S. Pat. No. 3,500,000 and also described in an article by D. L. Duttweiler entitled, "A Twelve-Channel Digital Echo Canceler", *IEEE Transactions on Communications*, VOL. COM-26, No. 5, May 1978, Pages 647–653. Briefly, echo canceler 104 includes adaptive transversal filter 107 and algebraic combining unit 109. Similarly, echo canceler 106 includes adaptive transversal filter 108 and algebraic combining unit 110. As indicated above, the inventive echo canceler arrangement shown in FIG. 1 can be employed in a sub-band echo canceler having multiple such sub-bands, the embodiment of FIG. 1 showing one such sub-band with the X and Y analysis filters not being shown and the E synthesis filter also not being shown. Such filter arrangements are shown in the Duttweiler U.S. patent application Ser. No. 08/368,687 and the Shaw U.S. patent application Ser. No. 08/368,684, noted above.

In practice microphone 111 picks up the desired speech signal from anybody talking in a room, enclosed area or the like, but also unavoidably picks up the audio output from loudspeaker 105. Conceptually, the audio signal picked up by microphone 111 has two acoustic echo path components, one echo path component is that which first echo canceler 104 is intended to capture, i.e., the substantially stationary and any slowly varying components of the echo path impulse response, and the other is that which the second echo canceler 106, in conjunction with delay 103, is intended to capture, namely, the more time varying, i.e., dynamically varying, component of the echo path impulse response. Because transversal filter 108 of second echo canceler 106 has a "shorter" impulse response synthesis capability than transversal filter 107 of first echo canceler 104, it will adapt significantly faster than the transversal filter 107 of first echo canceler 104 and, therefore, it can capture the more time varying component of the echo path impulse response. The slowly changing component is changing over seconds to minutes, while the more time varying component changes over 10's to 100's of milliseconds. In one example, not to be construed as limiting the scope of the invention, adaptive filter 107 of "long" echo canceler 104 includes 39 tap coefficients at 5 milliseconds thereby having a synthesis capability of 195 milliseconds, and adaptive filter 108 of "short" echo canceler 106 includes 8 tap coefficients at 5 milliseconds each, thereby having a synthesis capability of 40 milliseconds each (in a full-band acoustic echo canceler or in one sub-band of a sub-band acoustic echo canceler). It is noted that the time variation of the echo path impulse response is caused by the reflected echo components in the room, as well as movement of objects and/or people in the room.

In this example, first echo canceler 104 is primarily expected to synthesize the substantially stationary and any slower varying echo components of the echo path impulse response. To this end, adaptive transversal filter 107 of echo canceler 104 is relatively "long", i.e., has significantly more tap coefficients than adaptive filter 108 of echo canceler 106, and is configured to adapt relatively slowly, which will allow it to perform satisfactorily in synthesizing the substantially stationary component and any slowly varying component of the echo path impulse response. This slow adaptation is necessary in order to properly converge to the first echo estimate in the presence of the substantially stationary and any slowly varying components of the echo path impulse response. If the adaptation rate were too fast an erroneous first echo estimate could result. The signal y(k) from microphone 111 is supplied via transmission path 112 to algebraic combining unit 109, where a first echo estimate of the substantially stationary and any slowly varying components of the echo path impulse response, synthesized by adaptive transversal filter 107 of echo canceler 104, is subtracted from it to generate first error signal u(k). For purposes of this description transmission path 112 is considered to be the path from microphone to output terminal First error signal u(k) is supplied to adaptive transversal filter 107 where it is utilized in conjunction with the received signal x(k) to synthesize the first echo estimate, in well known fashion. First error signal u(k) is supplied to one input of algebraic combining unit 110 of echo canceler 106. Adaptive transversal filter 108 of echo canceler 106 synthesizes a second echo estimate of the time varying component of the echo path impulse response. To this end, adaptive transversal filter 108 is configured for fast adaptation. Additionally, note that in this example, because adaptive filter 108 has significantly fewer tap coefficients than adaptive filter 107, delay 103 is selected so that the tap coefficients of adaptive filter 108 are positioned in time relative to the echo path impulse response where the most time varying echo path impulse response component(s) are positioned relative to the tap coefficients of adaptive filter 107 impulse response. Typically, the center tap coefficient of adaptive filter 108 will be centered on the tap coefficient of adaptive filter 107 where the most time variation is known to occur. It should be noted, however, that it would not make sense to center the tap coefficients of adaptive filter 108 such that any of them would be below zero (0) time of the echo path coefficient of adaptive filter 107 at zero (0) time on the echo path impulse response, i.e., the first tap coefficient of adaptive filter 108 would, then, be aligned with the first tap coefficient of adaptive filter 107. Further, in certain applications the delay interval of fixed delay 103 may be selected to be zero (0). Additionally, in certain applications it may be desirable to skew the tap coefficients of adaptive transversal filter 108 one way or the other relative to the center tap coefficient.

The second echo estimate synthesized by adaptive transversal filter 108 is algebraically subtracted from first error signal u(k) by algebraic combining unit 110 to yield second error signal e(k). The second error signal e(k) is supplied to output terminal 113, as the desired output to be transmitted to a remote receiver, and is also supplied to adaptive transversal filter 108 where it is employed with the delayed input signal x(k) to adapt the second echo estimate, in well known fashion.

Figure 2:
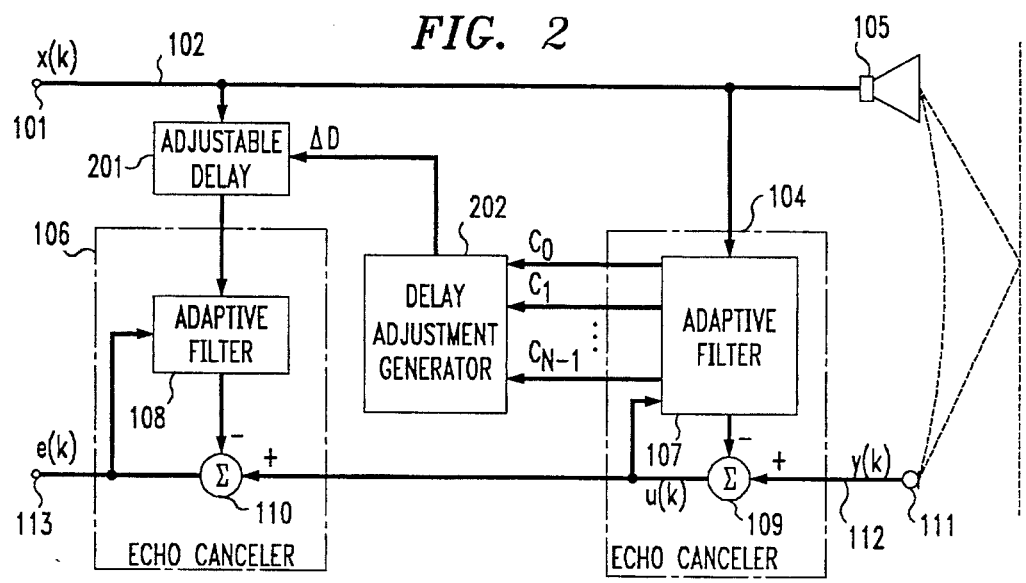
FIG. 2 shows, in simplified block diagram form, details of an audio system including first and second echo cancelers in an embodiment of the invention employing a dynamically adjustable delay in series with the second echo canceler.

FIG. 2 shows, in simplified block diagram form, details of an audio system including first and second echo cancelers in an embodiment of the invention employing a dynamically adjustable delay in series with the second echo canceler. The elements of the embodiment shown in FIG. 2 which are identical in structure and function to those shown in FIG. 1 have been similarly numbered and will not be described again in detail.

Specifically, shown is adjustable delay 201 being connected in series between receiver path 102 and echo canceler 106, and therein, adaptive transversal filter 108. Also shown, is delay adjustment generator 202 which is supplied with tap coefficient values from adaptive transversal filter 107 of echo canceler 104, namely, tap coefficients $C_0$, $C_1$ through $C_N$. Delay adjustment generator 202 employs tap coefficients $C_0$, $C_1$ through $C_N$ for generating a delay adjustment value $\Delta D$, which is supplied to adjustable delay 201 for dynamically adjusting the positions of the tap coefficients of adaptive filter 108 relative to the tap coefficients of adaptive filter 107 in order to cancel the more time varying component of the echo path impulse response. In certain applications, it may be desirable to shift the tap coefficients of the second adaptive filter 108 when the delay adjustment value $\Delta D$, which usually is an integer sample count. Thus, as the delay adjustment value $\Delta D$ changes from one value to another, it is advantageous to shift the tap coefficients of second adaptive filter 108 in order to maintain relative alignment with the tap coefficients of the first adaptive filter 107 and to compensate for the change in the delay adjustment value $\Delta D$. A number of embodiments of delay adjustment generator 202 are shown in FIGS. 3–5, and described below.

Figure 3:
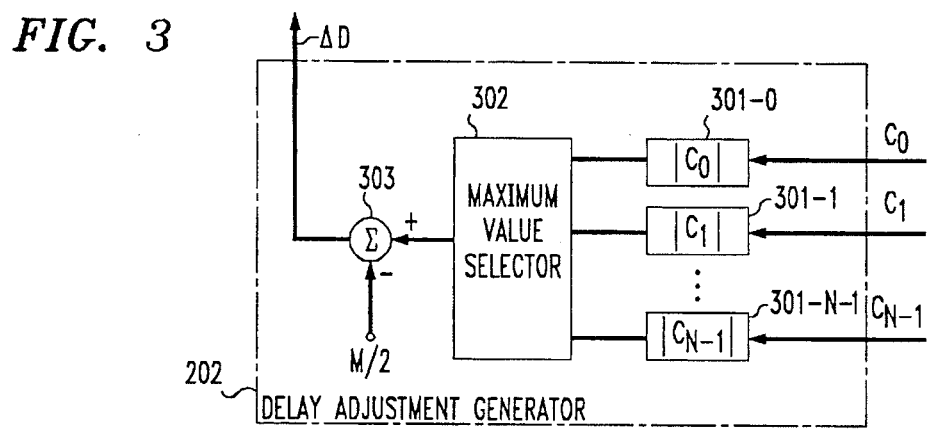
FIG. 3 shows, in simplified block diagram form, details of one adjustment generator which may be employed in the embodiment of FIG. 2.

FIG. 3 shows, in simplified block diagram form, details of one embodiment of adjustment generator 202 which may be employed in the embodiment of FIG. 2. Specifically, shown are magnitude units 301-0 through 301-N, to which tap coefficients $C_0$, $C_1$ through $C_N$ from adaptive transversal filter 107 (FIG. 2) are supplied for obtaining their respective magnitudes. Maximum value selector 302 selects the tap coefficient having the largest magnitude. Thereafter, algebraic combining unit 303 subtracts a prescribed value from the selected tap coefficient having the largest magnitude value, namely, M/2 in this example, in order to generate delay adjustment value $\Delta D$ such that the tap coefficients of adaptive filter 108 are centered about the tap coefficient of adaptive transversal filter 107 having the largest magnitude. The delay adjustment value $\Delta D$ is supplied to adjustable delay 201, where it is used to adjust the delay in series with echo canceler 106 to achieve the desired centering of the tap coefficients of adaptive transversal filter 108 about the tap coefficient of adaptive transversal filter 107 having the largest magnitude. Typically, the center tap coefficient of adaptive filter 108 will be centered on the tap coefficient of adaptive filter 107 where the most time variation is occurring. It should be noted, however, that it would not make sense to center the tap coefficients of adaptive filter 108 such that any of them would be below zero (0) time of the echo path coefficient of adaptive filter 107 at zero (0) time on the echo path impulse response, i.e., the first tap coefficient of adaptive filter 108 would, then, be aligned with the first tap coefficient of adaptive filter 107. Additionally, in certain applications it may be desirable to skew the tap coefficients of adaptive transversal filter 108 one way or the other relative to the center tap coefficient.

Figure 4:
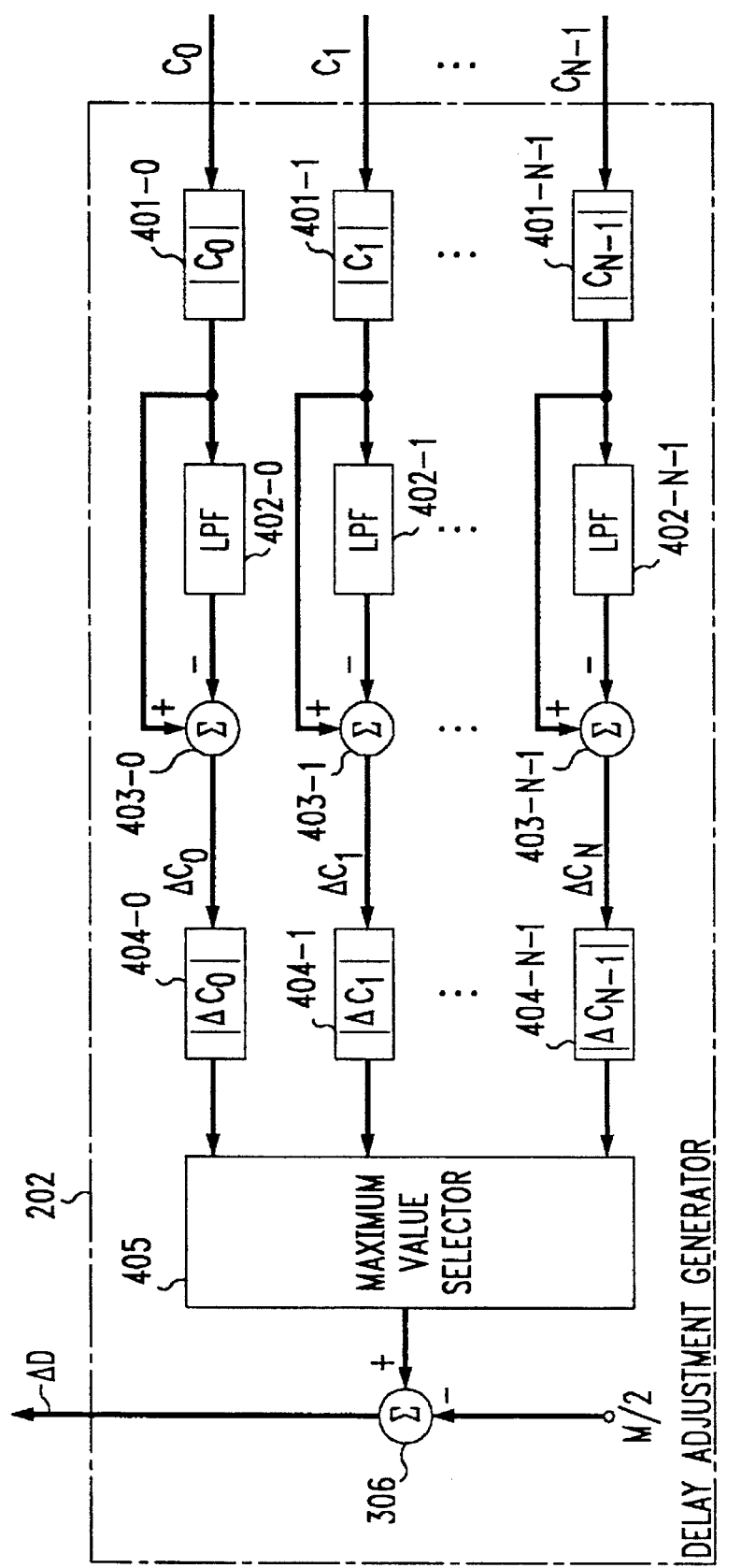
FIG. 4 shows, in simplified block diagram form, details of another adjustment generator which may be employed in the embodiment of FIG. 2.

FIG. 4 shows, in simplified block diagram form, details of another embodiment of adjustment generator 202 which may be employed in the embodiment of FIG. 2. Specifically, shown, are magnitude units 401-0 through 401-N, to which tap coefficients $C_0$, $C_1$ through $C_N$ from adaptive transversal filter 107 (FIG. 2) are supplied for obtaining their respective magnitudes. Long term averages of the magnitudes of tap coefficients $C_0$, $C_1$ through $C_N$ are obtained via low pass filters (LPFs) 402-0, 402-1 through 402-N and associated algebraic combining units 403-0, 403-1 through 403-N, respectively. As shown the output from each of LPFs 402 is algebraically subtracted via algebraic combining units 403 from the current value of the corresponding magnitude values from units 401 for the associated tap coefficients to yield difference values $\Delta C_0$, $\Delta C_1$ through $\Delta C_N$. Then, the magnitudes of difference values $\Delta C_0$, $\Delta C_1$ through $\Delta C_N$ are obtained via magnitude units 404-0, 404-1 through 404-N. Maximum value selector 405 selects the long term average tap coefficient having the largest differential magnitude value of $\Delta C_0$, $\Delta C_1$ through $\Delta C_N$. Thereafter, algebraic combining unit 306 subtracts a prescribed value from the selected tap coefficient, namely, M/2 in this example, in order to generate delay adjustment value $\Delta D$ such that the tap coefficients of adaptive filter 108 (FIG. 2) are centered about the tap coefficient of adaptive transversal filter 107 having the largest difference magnitude. The delay adjustment value $\Delta D$ is supplied to adjustable delay 201 (FIG. 2), where it is used to adjust the delay in series with echo canceler 106 to achieve the desired centering of the tap coefficients of adaptive transversal filter 108 about the tap coefficient of adaptive transversal filter 107 having the largest difference magnitude. Typically, the center tap coefficient of adaptive filter 108 will be centered on the tap coefficient of adaptive filter 107 where the most time variation is occurring. It should be noted, however, that it would not make sense to center the tap coefficients of adaptive filter 108 such that any of them would be below zero (0) time of the echo path coefficient of adaptive filter 107 at zero (0) time on the echo path impulse response, i.e., the first tap coefficient of adaptive filter 108 would, then, be aligned with the first tap coefficient of adaptive filter 107. Additionally, in certain applications it may be desirable to skew the tap coefficients of adaptive transversal filter 108 one way or the other relative to the center tap coefficient.

Figure 5:
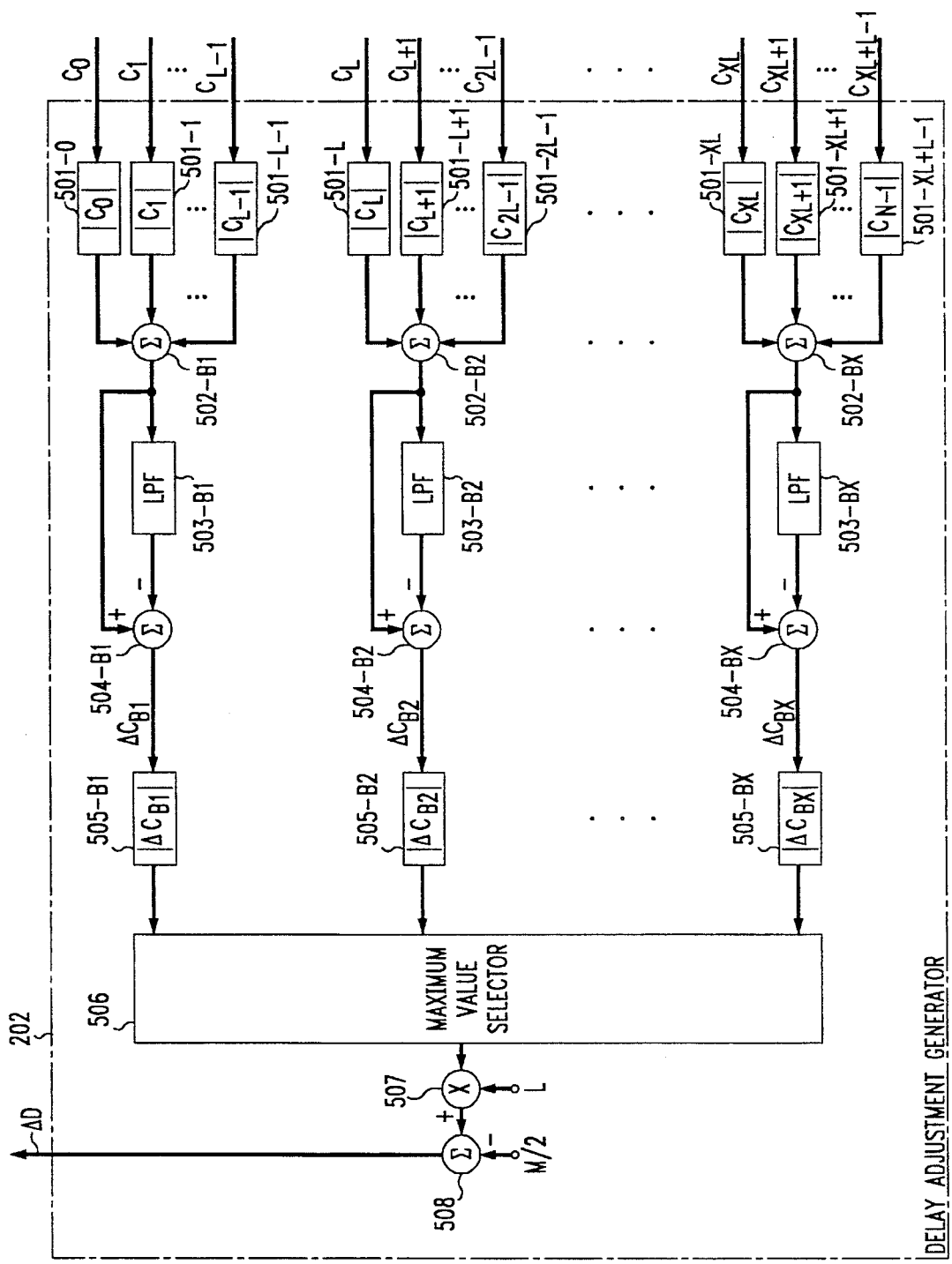
FIG. 5 shows, in simplified block diagram form, details of still another adjustment generator which may be employed in the embodiment of FIG. 2.

FIG. 5 shows, in simplified block diagram form, details of still another embodiment of delay adjustment generator 202, which may be employed in the embodiment of FIG. 2. Specifically, in this embodiment of delay adjustment generator 202 the tap coefficients from adaptive filter 107 (FIG. 2) are arranged into predetermined groups. In this example, each group has an equal number of tap coefficients, although in certain applications this may not be the case. Accordingly, shown are a first group including tap coefficients $C_0$, $C_1$ through $C_{L-1}$, a second group including tap coefficients $C_L$, $C_{L+1}$ through $C_{2L-1}$, through a last group including tap coefficients, $C_{XL}$, $C_{XL+1}$ through $C_{XL+L-1}$. Also shown, are magnitude units 501-0, 501-1 through 501-L–1, to which tap coefficients $C_0$, $C_1$ through $C_{L-1}$, respectively, from adaptive transversal filter 107 (FIG. 2) are supplied for obtaining their respective magnitudes, magnitude units 501-L, 501-L+1 through 501-2L–1, to which tap coefficients $C_L$, $C_{L+1}$ through $C_{2L-1}$, respectively, are supplied for obtaining their respective magnitudes, and magnitude units 501-L, 501-XL+1 through 501+-L–1, to which tap coefficients $C_L$, $C_{L+1}$ through $C_{2L-1}$, respectively, are supplied for obtaining their respective magnitudes. The coefficient magnitude value outputs from magnitude units 501 for each group are supplied to a corresponding algebraic combining unit, namely, outputs from magnitude units 501-1 through 501-L–1 are supplied to summing unit 502-B1, outputs from magnitude units 501-L through 501-2L–1 are supplied to summing unit 502-B2, and outputs from magnitude units 501-XL through 501-XL+L–1 are supplied to summing unit 502-BX. Note that the coefficient magnitude outputs from any intervening groups between the second group and the last group are supplied to a corresponding summing unit 502. Long term averages of the summed magnitudes of the tap coefficients from each of the summing units 502 are obtained by supplying the summed values from summing units 502-B1, 502-B2 through 502-BX to LPFs 503-B1, 503-B2 through 503-BX, respectively, and to algebraic combing units 504-B1, 504-B2 through 504-BX, respectively, where they are subtracted from the outputs from LPFs 503-B1, 503-B2 through 503-BX, respectively, to yield difference values $\Delta C_{B1}$, $\Delta C_{B2}$ through $\Delta C_{BX}$. Then, the magnitudes of difference values $\Delta C_{B1}$, $\Delta C_{B2}$ through $\Delta C_{BX}$ are obtained via magnitude units 505-B1, 505-B2 through 505-BX. Maximum value selector 506 selects the largest of the long term average tap coefficient difference magnitude value of $\Delta C_{B1}$, $\Delta C_{B2}$ through $\Delta C_{BX}$. Then, multiplier unit 507 multiples the selected difference magnitude value by the number of tap coefficients in each of the groups the groups, namely, L. Thereafter, algebraic combining unit 508 subtracts a prescribed value from the output from multiplier unit 507, namely, M/2 in this example, in order to generate delay adjustment value $\Delta D$ such that the tap coefficients of adaptive filter 108 (FIG. 2) are centered about the tap coefficient of adaptive transversal filter 107 having the largest difference magnitude value. The delay adjustment value $\Delta D$ is supplied to adjustable delay 201 (FIG. 2), where it is used to adjust the delay in series with echo canceler 106 to achieve the desired centering of the tap coefficients of adaptive transversal filter 108 about the tap coefficient of adaptive transversal filter 107 having the largest difference magnitude value. Typically, the center tap coefficient of adaptive filter 108 will be centered on the tap coefficient of adaptive filter 107 where the most time variation is known to occur. It should be noted, however, that it would not make sense to center the tap coefficients of adaptive filter 108 such that any of them would be below zero (0) time of the echo path coefficient of adaptive filter 107 at zero (0) time on the echo path impulse response, i.e., the first tap coefficient of adaptive filter 108 would, then, be aligned with the first tap coefficient of adaptive filter 107. Additionally, in certain applications it may be desirable to skew the tap coefficients of adaptive transversal filter 108 one way or the other relative to the center tap coefficient.

Although several arrangements have been disclosed regarding alignment of the tap coefficients of the second adaptive filter relative to the tap coefficients of the first adaptive filter, and for generating the delay adjustment signal $\Delta D$, it will be apparent to those skilled in the art that other such arrangements may be employed without departing from the spirit or scope of the invention. For example, a so-called center-of-gravity technique may be employed to align the tap coefficients of the second adaptive filter relative to the tap coefficients of the first adaptive filter, and the groups of tap coefficients of the first adaptive filter employed in generating the delay adjustment signal $\Delta D$ may have a different number of tap coefficients per group.

I claim:

1. An acoustic echo canceler arrangement comprising:

a receive path;

a transmit path;

first echo canceler means, connected between the receive path and the transmit path, and having a first impulse response synthesis capability for generating a first error signal and for canceling echo signals in the transmit path;

delay means, having an input and an output, the input being connected to the receive path for delaying incoming signals on the receive path; and at least second echo canceler means, having a second impulse response synthesis capability comparatively shorter than said first impulse response synthesis capability of said first echo canceler means, connected in series with said delay means and to the transmit path, said series connection of said delay means and said at least second echo canceler means being connected in parallel with said first echo canceler means between the receive path and the transmit path, said at least second echo canceler means being supplied with said first error signal and being adaptive to operate simultaneously with but independent of said first echo canceler means for further canceling echo signals in said transmit path, said delay means providing a delay for positioning the second impulse response synthesis capability of said at least second echo canceler means in time relative to said first impulse response synthesis capability of said first echo canceler means.

2. The invention as defined in claim 1 wherein said delay means includes a fixed delay interval for positioning the second impulse response synthesis capability of said at least second echo canceler means in a predetermined time position relative the first impulse response synthesis of said first echo canceler means.

3. The invention as defined in claim 2 wherein said delay means provides a fixed delay of zero (0).

4. The invention as defined in claim 1 wherein said first echo canceler means includes a first adaptive transversal filter configured to generate a first echo estimate of a relatively time invariant echo component of the echo signals in said transmit path and first algebraic combining means for algebraically subtracting the first echo estimate from a signal supplied to the transmit path, and wherein said at least second echo canceler means includes a second adaptive transversal filter configured to generate a second echo estimate of the time varying echo component in said first error signal in the transmit path and second algebraic combining means for algebraically subtracting the second echo estimate from the first error signal to yield a second error signal.

5. The invention as defined in claim 4 wherein the first impulse response synthesis capability of said first echo canceler means is comparatively long in order to cancel echos of long time duration and the second impulse response synthesis capability of said at least second echo canceler means is comparatively short in order to cancel echos of short time duration.

6. The invention as defined in claim 1 wherein said first echo canceler includes a first adaptive transversal filter having an adaptation rate which is comparatively slow so that the first adaptive transversal filter can converge to the first echo estimate and wherein said second echo canceler includes a second adaptive filter having an adaptation rate which is comparatively fast so that the second adaptive transversal filter can track time variant echo components in the first error signal.

7. The invention as defined in claim 1 wherein said delay means comprises controllably adjustable delay means, being responsive to a delay adjustment control signal, for controllably positioning in time the second impulse response synthesis capability of said at least second echo canceler relative to said first impulse response synthesis capability of said first echo canceler, and further including means, responsive to the tap coefficient values of the first adaptive filter of said first echo canceler means, for generating said delay adjustment control signal.

8. The invention as defined in claim 7 wherein said means for generating, generates said delay adjustment control signal based on magnitude values of the tap coefficients of said first adaptive filter of said first echo canceler means.

9. The invention as defined in claim 8 wherein said means for generating, generates said delay adjustment control signal based on the largest magnitude value of the tap coefficients of said first adaptive filter of said first echo canceler means.

10. The invention as defined in claim 9 further including means supplied with said largest magnitude value for adjusting the delay adjustment control signal such that the delay positions of the second impulse response capability of said at least second echo canceler means are centered about the first adaptive filter tap coefficient having the largest magnitude value.

11. The invention as defined in claim 8 wherein said means for generating includes means for obtaining a long term average value for each of said first adaptive filter tap coefficient magnitude values, means for algebraically combining the long term average value of each of said tap coefficient magnitude values with its corresponding current value to obtain a difference value for each of said first adaptive filter tap coefficient magnitude values, means for obtaining magnitude a magnitude value for each of said difference values, and means for selecting the largest of the difference value magnitudes to be used in generating said delay adjustment control signal.

12. The invention as defined in claim 11 further including means supplied with said largest difference magnitude value for modifying the delay adjustment control signal such that the delay positions the second impulse response capability of said at least second echo canceler means so that it is centered about the first adaptive filter tap coefficient having the largest difference magnitude value.

13. The invention as defined in claim 8 wherein said first adaptive tap coefficient magnitude values are arranged into a plurality of groups, and further including a plurality of means associated on a one-to-one basis with said plurality of groups for summing the first adaptive filter tap coefficient magnitude values in each of said plurality of groups, a plurality of means, associated on a one-to-one basis with said plurality of summing means, for obtaining a long term average value for each of said groups of summed first adaptive filter tap coefficient magnitude values, a plurality of means, associated on a one-to-one basis with said plurality of means for obtaining said long term averages, for algebraically combining the long term average value of each of said groups of summed tap coefficient magnitude values with its corresponding current value to obtain a difference value for each of said groups of first adaptive filter tap coefficient magnitude values, means for obtaining a magnitude value for each of said difference values, and means for selecting the largest of the difference value magnitudes of said groups to be used in generating said delay adjustment control signal.

14. The invention as defined in claim 13 further including means supplied with said largest difference magnitude value for modifying said largest difference magnitude value such that the delay adjustment control signal positions of the second impulse response capability of said at least second echo canceler means are centered about the first adaptive filter tap coefficient having the largest difference magnitude value.

15. The invention as defined in claim 14 wherein said means for modifying includes means for adjusting the selected largest difference magnitude value to compensate for the number of fist adaptive filter tap coefficients in each of the plurality of groups, and means for modifying the adjusted largest difference magnitude value such that the delay adjustment control signal positions of the second impulse response capability of said at least second echo canceler means are centered about the first adaptive filter tap coefficient having the largest difference magnitude value.

16. A sub-band acoustic echo canceler arrangement comprising:

a receive path;

a transmit path;

first analysis filter means including a predetermined number of first filters for decomposing a received signal on said receive path into the predetermined number of sub-band signals in an equal number of sub-bands, each of said first filters having a predetermined first passband;

second analysis filter means including the predetermined number of second filters for decomposing a transmit signal into the predetermined number of sub-band signals in an equal number of sub-bands, each of said second filters having a predetermined second passband;

a plurality of echo canceler means equal to the predetermined number and being supplied with the sub-band signals from said first analysis filter means and the sub-band signals from said second analysis filter means for canceling echos in the corresponding sub-bands and for generating the predetermined number of error signals, each of said echo canceler means including first echo canceler means, connected between the receive path and the transmit path, and having a first impulse response synthesis capability for generating a first error signal and for canceling echo signals in the transmit path, delay means, having an input and an output, the input being connected to the receive path for delaying incoming signals on the receive path, and at least second echo canceler means, having a second impulse response synthesis capability comparatively shorter than said first impulse response synthesis capability of said first echo canceler means, connected in series with said delay means and to the transmit path, said series connection of said delay means and said at least second echo canceler means being connected in parallel with said first echo canceler means between the receive path and the transmit path, said at least second echo canceler means being supplied with said first error signal and being adaptive to operate simultaneously with but independent of said first echo canceler means for further canceling echo signals in said transmit path, said delay means providing a delay for positioning the second impulse response synthesis capability of said at least second echo canceler means in time relative to said first impulse response synthesis capability of said first echo canceler means; and synthesis filter means being supplied with the predetermined number of error signals from said echo canceler means for synthesizing an output signal, each of said at least second echo canceler means being operative to generate one of said predetermined number of error signals.

17. The invention as defined in claim 16 wherein each of said delay means includes a fixed delay interval for positioning the second impulse response synthesis capability of said at least second echo canceler means in a predetermined time position relative the first impulse response synthesis of said first echo canceler means.

18. The invention as defined in claim 16 wherein each of said first echo canceler means includes a first adaptive transversal filter configured to generate a first echo estimate of a relatively time invariant echo component of the echo signals in said transmit path and first algebraic combining means for algebraically subtracting the first echo estimate from a signal supplied to the transmit path, and wherein each of said at least second echo canceler means includes a second adaptive transversal filter configured to generate a second echo estimate of the time varying echo component in said first error signal in the transmit path and second algebraic combining means for algebraically subtracting the second echo estimate from the first error signal to yield a second error signal.

19. The invention as defined in claim 18 wherein the first impulse response synthesis capability of each of said first echo canceler means is comparatively long in order to cancel echos of long time duration and the second impulse response synthesis capability of each of said at least second echo canceler means is comparatively short in order to cancel echos of short time duration.

20. The invention as defined in claim 16 wherein said first echo canceler includes a first adaptive transversal filter having an adaptation rate which is comparatively slow so that the first adaptive transversal filter can converge to the first echo estimate and wherein said second echo canceler includes a second adaptive filter having an adaptation rate which is comparatively fast so that the second adaptive transversal filter can track time variant echo components in the first error signal.

21. The invention as defined in claim 16 wherein each of said delay means comprises controllably adjustable delay means, being responsive to a delay adjustment control signal, for controllably positioning in time the second impulse response synthesis capability of said at least second echo canceler relative to said first impulse response synthesis capability of said first echo canceler, and further including means responsive to the tap coefficient values of the first adaptive filter of said first echo canceler means, for generating said delay adjustment control signal.

22. The invention as defined in claim 21 wherein said means for generating generates said delay adjustment control signal based on magnitude values of the tap coefficients of said first adaptive filter of said first echo canceler means.

* * * * *